US005789020A

United States Patent [19]

Tran

[11] Patent Number: 5,789,020
[45] Date of Patent: Aug. 4, 1998

[54] METHOD OF FORMING A HOT FILM SENSOR SYSTEM ON A MODEL

[75] Inventor: Sang Q. Tran, Yorktown, Va.

[73] Assignee: The United States of America as represented by the Administrator of the National Aeronautics and Space Administration, Washington, D.C.

[21] Appl. No.: 613,305

[22] Filed: Mar. 11, 1996

[51] Int. Cl.$^6$ ............................................. B05D 5/00
[52] U.S. Cl. ................... 427/58; 427/379; 427/385.5; 427/421; 73/147; 73/204.11
[58] Field of Search ........................ 427/58, 255.6, 427/385.5

[56] References Cited

U.S. PATENT DOCUMENTS

| | | | |
|---|---|---|---|
| 4,555,414 | 11/1985 | Hoover et al. | 427/43.1 |
| 4,727,751 | 3/1988 | Holmes et al. | 73/147 |
| 4,936,146 | 6/1990 | Stack et al. | 73/432.1 |
| 5,149,615 | 9/1992 | Chakravorty et al. | 430/313 |
| 5,158,801 | 10/1992 | Hopson, Jr. et al. | 427/58 |
| 5,349,851 | 9/1994 | Martinson et al. | 73/147 |
| 5,382,447 | 1/1995 | Kaja et al. | 427/126.6 |
| 5,484,517 | 1/1996 | Hopson, Jr. | 205/88 |

*Primary Examiner*—Robert Kunemund
*Assistant Examiner*—Michael E. Adjadha
*Attorney, Agent, or Firm*—Kimberly A. Chasteen

[57] ABSTRACT

A method of forming a hot film sensor directly on a model is provided. A polyimide solution is sprayed onto the model. The model so sprayed is then heated in air. The steps of spraying and heating are repeated until a polyimide film of desired thickness is achieved on the model. The model with the polyimide film thereon is then thoroughly dried in air. One or more hot film sensors and corresponding electrical conducting leads are then applied directly onto the polyimide film.

14 Claims, 2 Drawing Sheets

METHOD OF FORMING A HOT FILM SENSOR SYSTEM ON A MODEL

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to hot film sensors. More specifically, the invention is a method for forming a hot film sensor system directly on a model surface that is three-dimensional.

2. Description of the Related Art

Hot film sensors are used in flow analysis for detecting the beginning and end of boundary layer transition on a model surface. In order to analyze flow over the particular surface, it is desirable to minimize the height or thickness of the sensors so as not to obscure the capabilities/deficiencies of the surface being analyzed. State-of-the-art conventional hot film sensors are on the order of 0.001 inches thick. While this is below the permissible critical roughness height of 0.006 inches, a thinner sensor is preferred.

In addition, flow analysis is typically carried out in both ambient temperature facilities as well as cryogenic facilities. Thus, it is also desirable for the hot film sensor to be able to withstand a wide range of temperature extremes. One hot film sensor designed for operation over a wide temperature range is disclosed in U.S. Pat. No. 5,484,517. The sensor is a multi-element device formed on a polyimide film. However, the thickness of the polyimide film alone is 0.002 inches. Furthermore, the sensor must be glued to the model. However, the usefulness of the sensor is limited since the range of temperatures over which the glue maintains its integrity is smaller than the temperature range required of the hot film sensor.

Furthermore, the surfaces of the models being analyzed are generally three-dimensional. However, it is difficult to adhere hot film sensors evenly to a three-dimensional surface. This increases the possibility that the hot film sensor will serve as a flow obstruction that distorts the flow analysis.

SUMMARY OF THE INVENTION

Accordingly, it is an object of the present invention to provide a hot film sensor system that operates over a wide-temperature range.

Another object of the present invention is to provide a method of forming a hot film sensor that presents no significant surface roughness even on three-dimensional model surfaces.

Other objects and advantages of the present invention will become more obvious hereinafter in the specification and drawings.

In accordance with the present invention, a method of forming a hot film sensor directly on a model is provided. A polyimide solution is sprayed onto the model. The model so sprayed is then heated in air at a temperature not to exceed 150° C. for not more than 30 minutes. The steps of spraying and heating are repeated until a polyimide film of desired thickness is achieved on the model. The model with the polyimide film thereon is then thoroughly dried in air at a temperature not to exceed 250° C. for not more than one hour. One or more hot film sensors and corresponding electrical conducting leads are then applied directly onto the polyimide film.

DETAILED DESCRIPTION OF THE INVENTION

Figure 1:
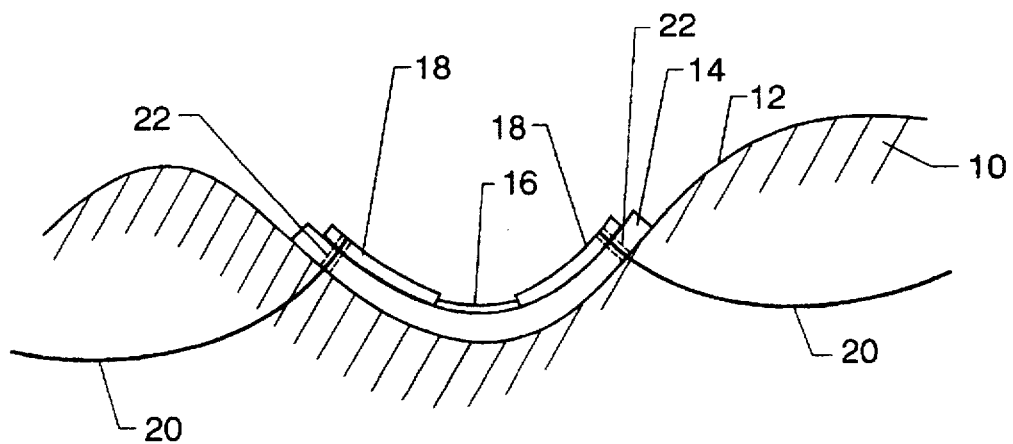
FIG. 1 is a side view of the hot film sensor system constructed in accordance to the present invention.
Figure 2:
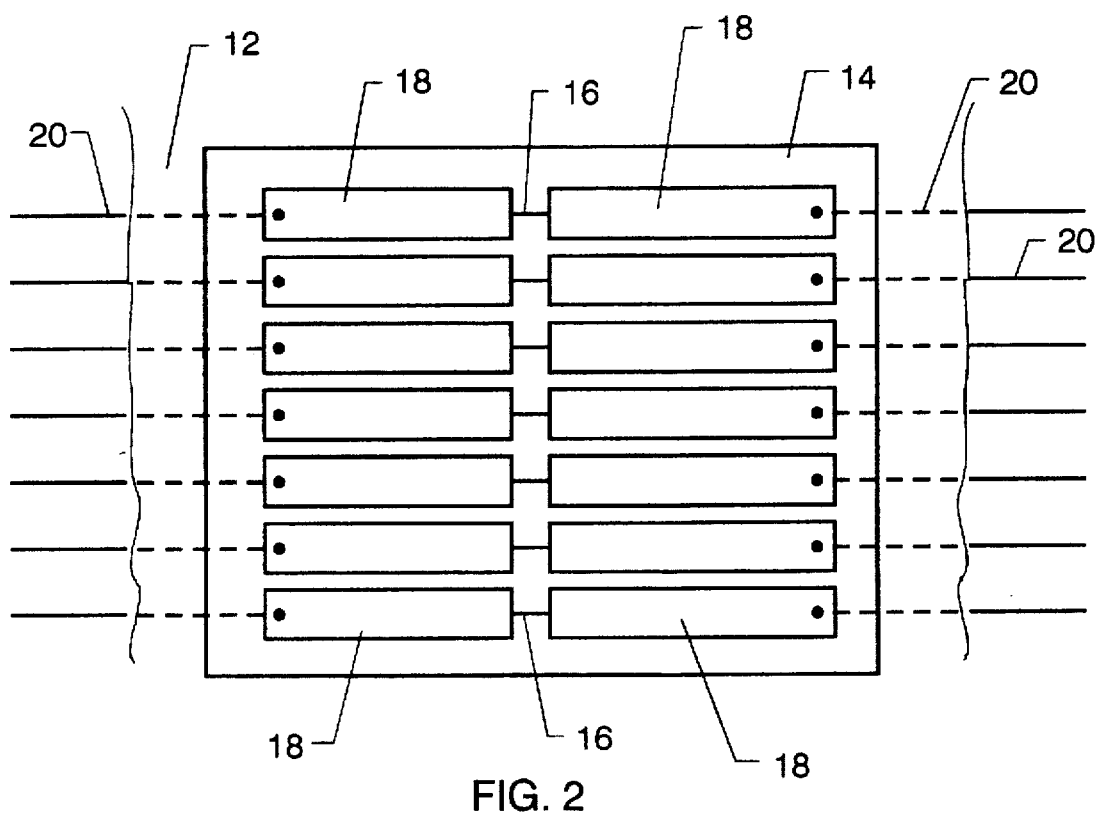
FIG. 2 is a plan view of the hot film sensor system.

Referring now to the drawings, and more particularly to FIGS. 1 and 2, side and plan views are respectively shown of a hot film sensor system constructed according to the method of the present invention. Like reference numerals will be used for common elements in the two views. For purpose of illustration and to emphasize the advantages of the present invention, the figures show a portion of a model 10 having a three-dimensional surface 12 on which the hot-film sensor system is to be constructed. However, the method of the present invention can also be used to construct a hot film sensor system on a two-dimensional or planar (model) surface.

The hot film sensor system consists of a polyimide film 14 formed and adhered directly on surface 12 as will be described in detail below. One or more hot film sensors 16, e.g., nickel, platinum, palladium, etc., are deposited on film 14. Electrically conducting leads 18, e.g., copper, aluminum, gold, etc., are also deposited on film 14 to make contact with sensors 16. Lead wires 20 are typically fed up to conducting leads 18 through feed holes 22 passing through model 10 and film 14. The method for forming such a hot film sensor will now be described.

As mentioned above, film 14 is a polyimide film. By way of example, the polyimide is Pyralin Polyimide LTP PI-2590-D manufactured by DuPont Electronics. In order to be used in the present invention, the polyimide must be placed in solution form of lower viscosity suitable for use in conventional spraying equipment. Examples of such spraying equipment are air brush 10 sprayers manufactured by either Pasche Airbrush Co. (e.g., model H5) or Badger Airbrush Co. (e.g., model 150-3-HD). For the above disclosed polyimide, the solution consisted of approximately one part of the polyimide and approximately three parts of a compatible carrier solvent or thinner, e.g., the T9039 thinner manufactured by DuPont Electronics. The polyimide and thinner were mixed thoroughly until a homogeneous solution was achieved. Such mixing can be accomplished by hand or by using conventional mixing equipment as is known in the art. The resulting polyimide solution was placed in a sprayer and applied directly to surface 12 of model 10.

The method of spraying model 10 to achieve film 14 is carried out as follows. Surface 12 must first be clean and free of contaminants. Accordingly, surface 12 is first cleaned with a microelectronics cleaner such as methanol, isopropanol, etc., as is well known in the art. After surface 12 is dry, the first of multiple spray coatings is applied. Each coating is applied in accordance with spray painting techniques to achieve uniform coverage for good adhesion while being careful to avoid applying any coating too heavily which can cause "running". After each spray coating, the model so sprayed is baked or heated at a temperature not to exceed 150° C. for a time not to exceed 30 minutes. Each heating is accomplished in an air environment. After each heating, the model so sprayed is cooled to room temperature prior to the next spray application.

The multiple coatings are applied until a desired thickness is achieved thereby producing film 14. The goals for film 14 are that it should provide a good dielectric layer for proper electrical isolation of the hot film sensor from the (metal) model while not significantly changing the surface of the model. For purpose of the hot film sensor of the present invention, the thickness of film 14 should be at least approximately 0.0003 inches and not more than approximately 0.001 inches. Preferably, the thickness is between approximately 0.0003 inches and approximately 0.0005 inches.

Once the desired thickness of film 14 is achieved, model 10 with film 14 must be completely heated/dried at a temperature of 250° C. for a time not to exceed one hour, although 30 minutes was found to be sufficient. Once again, this step is accomplished in an air environment.

Next, model 10 with film 14 is placed in a vacuum chamber (not shown) in preparation for the deposition of materials used for both sensors 16 and leads 18. The materials, e.g., metals, are deposited onto film 14 in the vacuum chamber using electron beam deposition and, typically, with assistance from ion beam bombardment as is known in the art. Sensors 16 and leads 18 must then be formed in a selective manner in order to produce a pattern such as that shown by way of example in FIG. 2. Suitable methods of accomplishing this selective formation include masking techniques or photolithography techniques. Such methods are well known in the art and will not be discussed herein. Since the materials for sensors 16 and leads 18 are deposited on the shaped surface of film 14, both sensors 16 and leads 18 are formed in conformity with the shape of surface 12. Thus, sensors 16 and leads 18 need not be bent to conform to such shape so that sensors 16 and leads 18 are not prone to buckling.

The advantages of the present invention are numerous. Direct deposition of the hot film sensor onto a model's surface means that problems associated with applying a hot film sensor to a three-dimensional surface are virtually eliminated. Good adhesion of the polyimide film, sensors and leads is achieved without the use of glue thereby avoiding problems of adhesion and delamination. By using multiple spray applications of a polyimide solution, an extremely thin dielectric film is achievable thereby greatly decreasing the overall thickness of the hot film sensor system. The polyimide film adheres to the model's surface without glue. Thus, the resulting hot film sensor system can be used in a wide variety of conditions ranging from cryogenic conditions of −250° F. to elevated temperatures exceeding 400° F.

Figure 3:
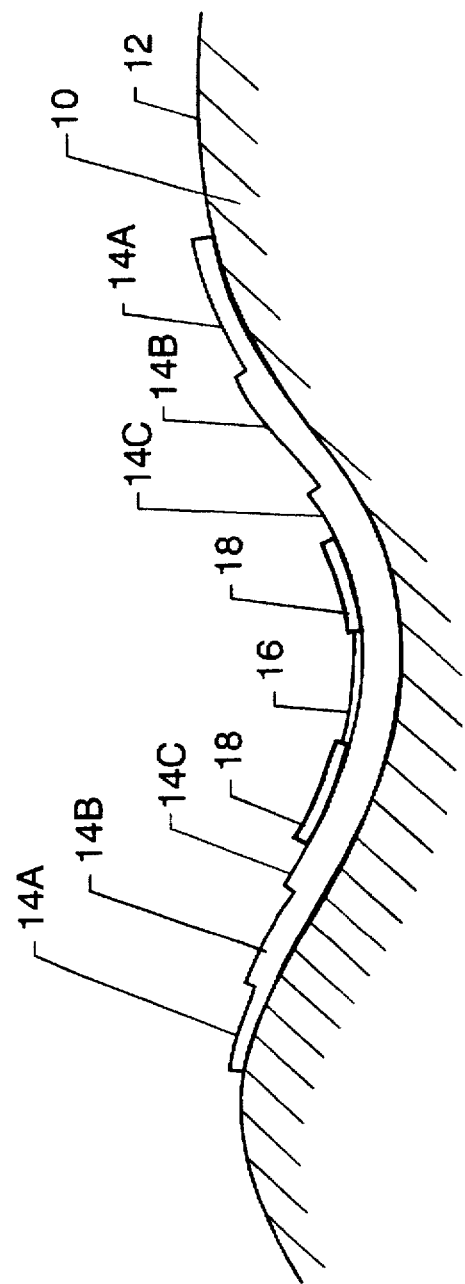
FIG. 3 shows a side view another hot film sensor system constructed such that the edges of the polyimide film are faired.

Although the invention has been described relative to a specific embodiment thereof, there are numerous variations and modifications that will be readily apparent to those skilled in the art in light of the above teachings. For example, the multiple spray coatings of the polyimide film could be applied to a smaller area with each successive application in order to fair the edges of the resulting polyimide film. This is shown in FIG. 3 where polyimide film 14 has, for example, multiple steps 14A, 14B and 14C around the edges thereof. Each of steps 14A, 14B, and 14C would be formed from a separate spray application of the polyimide solution. The number, shape, position and size of each step can be customized for a particular application. It is therefore to be understood that, within the scope of the appended claims, the invention may be practiced other than as specifically described.

What is claimed as new and desired to be secured by Letters Patent of the united states is:

1. A method of forming a hot film sensor system, comprising the steps of:

provide a substrate having a three-dimensional surface;

spraying a polyimide solution onto an area of said three-dimensional surface;

heating said three-dimensional surface sprayed with said polyimide solution, said step of heating occurring in air at a temperature not to exceed 150° C. for not more than 30 minutes;

repeating said steps of spraying and heating to achieve a polyimide film of desired thickness on said three-dimensional surface;

drying said three-dimensional surface having said polyimide film thereon in air at a temperature not to exceed 250° C. for not more than one hour; and applying at least one sensor and corresponding electrical conducting leads onto said polyimide film.

2. A method according to claim 1, wherein said step of repeating includes the step of successively reducing said area of said three-dimensional surface so sprayed such that said polyimide film is faired around the edges thereof.

3. A method according to claim 1 wherein said desired thickness is not more than approximately 0.0005 inches.

4. A method according to claim 1 wherein said step of heating is carried out at 150° C. for 30 minutes.

5. A method according to claim 8 wherein said step of drying is carried out at 250° C. for 30 minutes.

6. A method according to claim 1 wherein said step of applying comprises the steps of:

placing said three-dimensional surface having said polyimide film thereon in a vacuum;

depositing a plurality of metals onto said polyimide film; and selectively forming said at least one sensor and said corresponding electrical conducting leads from said plurality of metals.

7. A method according to claim 6 wherein said step of selectively forming includes the use of masking techniques.

8. A method according to claim 6 wherein said step of selectively forming includes the use of photolithography techniques.

9. A method of forming a hot film sensor system, comprising the steps of:

providing a substrate having a three-dimensional surface;

mixing a polyimide polymer with a thinner to form a homogeneous polyimide solution of a sprayable viscosity;

spraying said homogeneous polyimide solution onto an area of said three-dimensional surface;

heating said three-dimensional surface sprayed with said homogeneous polyimide solution, said step of heating occurring in air at a temperature not to exceed 150° C. for not more than 30 minutes;

repeating said steps of spraying and heating to achieve a polyimide film of desired thickness on said three-dimensional surface;

drying said three-dimensional surface having said polyimide film thereon in air at a temperature not to exceed 250° C. for not more than one hour; and applying at least one sensor and corresponding electrical conducting leads onto said polyimide film.

10. A method according to claim 9, wherein said step of repeating includes the step of successively reducing said area of said three-dimensional surface so sprayed such that said polyimide film is faired around the edges thereof.

11. A method according to claim 9 wherein said desired thickness is not more than approximately 0.0005 inches.

12. A method according to claim 9 wherein said step of mixing comprises the step of providing approximately one part of said polyimide polymer and approximately three parts of said thinner.

13. A method according to claim 12 wherein said step of heating is carried out at 150° C. for 30 minutes.

14. A method according to claim 13 wherein said step of drying is carried out at 250° C. for 30 minutes.

* * * * *